United States Patent [19]

Byrnes

[11] Patent Number: 4,624,690
[45] Date of Patent: Nov. 25, 1986

[54] APPARATUS FOR REMOVING PARTICULATES

[75] Inventor: John Byrnes, Lebanon, Conn.

[73] Assignee: Markel Industries, Inc., Enfield, Conn.

[21] Appl. No.: 750,335

[22] Filed: Jun. 28, 1985

[51] Int. Cl.⁴ ............................................. B01D 50/00
[52] U.S. Cl. .............................. 55/385 R; 55/DIG. 29; 15/316 R
[58] Field of Search ............ 55/302, DIG. 29, 385 R, 55/473; 15/310, 346, 316 R; 134/56 R

[56] References Cited

U.S. PATENT DOCUMENTS

| | | | |
|---|---|---|---|
| 2,910,719 | 11/1959 | Long | 15/316 R |
| 3,624,919 | 12/1971 | Miller | 15/316 R X |
| 3,802,168 | 4/1974 | Deckas | 55/423 |
| 3,849,091 | 11/1974 | Peterson | 55/302 |
| 4,161,801 | 7/1979 | Day et al. | 15/316 R |
| 4,433,698 | 2/1984 | Blaul | 134/56 R |
| 4,446,592 | 5/1984 | McElroy | 15/316 R |

Primary Examiner—Charles Hart
Attorney, Agent, or Firm—McCormick, Paulding & Huber

[57] ABSTRACT

An apparatus for removing particulates from objects comprises a cleaning chamber which is open on at least one side to receive the object, a curtain of air which covers the opening to the cleaning chamber, and two converging air streams within the cleaning chamber, which converging air streams create turbulence in the vicinity of the object and dislodge particulates from it. The air curtain acts as a barrier to prevent such dislodged particulates from escaping into the surrounding environment. The air streams and the air curtain are recirculated and HEPA filtered to trap the dislodged particulates.

43 Claims, 17 Drawing Figures

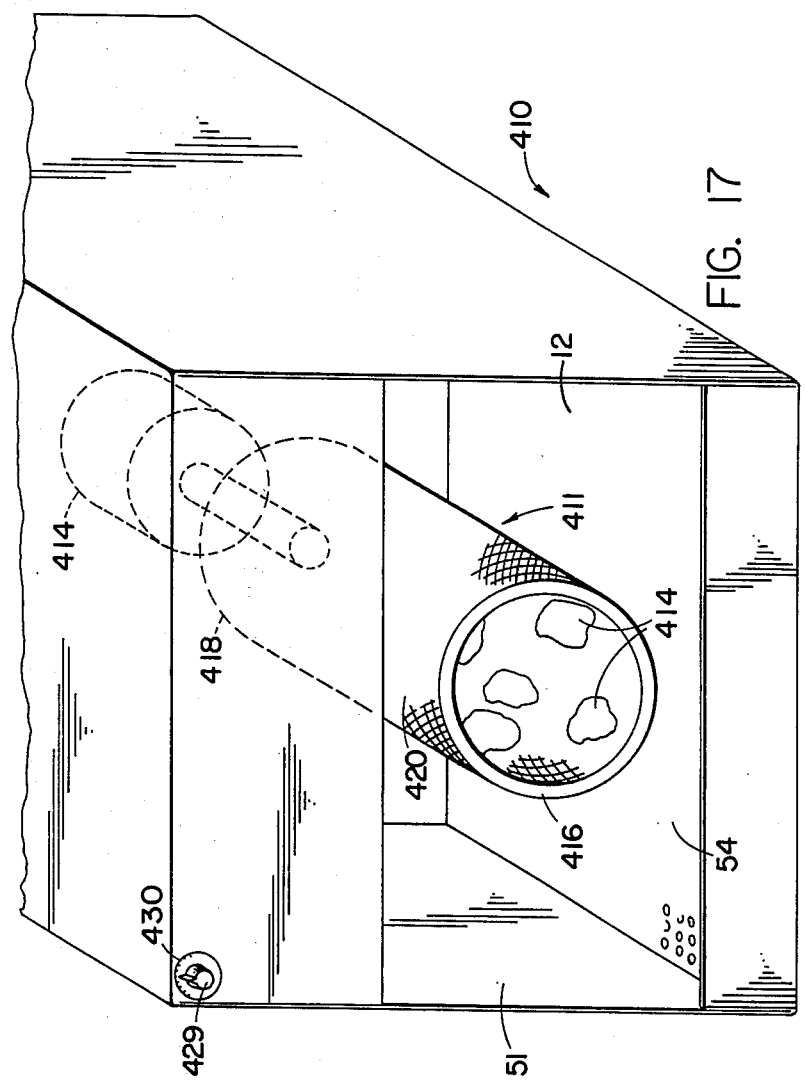

APPARATUS FOR REMOVING PARTICULATES

BACKGROUND OF THE INVENTION

The invention relates generally to apparatuses for removing particulates from objects and deals more particularly with apparatuses which remove particulates from gloved hands, clad feet, wipes and other objects by use of an air stream, and prevents the removed particulates from re-entering the surrounding environment.

Apparatuses of the general type with which this invention is concerned are used in conjunction with clean rooms such as semiconductor and pharmaceutical fabrication rooms, hospital operating rooms, certain laboratories any other rooms where it is important to provide an environment which is very low in particulates such as dirt, dust, skin cells and bacteria. In such rooms, workers often wear gloves and booties to prevent such particulates on their hands and feet from contaminating objects which the worker touches and to prevent such particulates from being shaken into the air from their hands and feet and randomly contaminating other objects in the room.

A worker often begins a work day with a relatively clean pair of gloves and booties which he or she removes directly from sealed packages in a clean room. However, in removing the gloves and booties, some particulates from within the packages escape into the clean room and in donning the gloves and booties, the worker invariably touches exterior surfaces of them with his or her hands and thereby contaminates such exterior surfaces. Also, during the course of a workday, the worker often touches his or her hands to exposed portions of his or her face and to other relatively dirty objects and thereby, contaminates the gloves further, and often brushes his or her feet against dirty furniture and steps on dirty portions of the floor and thereby contaminates the booties further.

Presently, it is common for workers to change their gloves and booties during the course of a workday and discard the contaminated, old ones. Also, there are air showers located adjacent or within some clean rooms to clean particulates from a person, which air showers typically comprise a small enclosed shower room having an entrance door and an exit door, and blowers which produce air streams within the shower room. The blowers force air through apertures in the walls and ceilings of the shower room and return the air through other apertures usually in the floor. High efficiency air particulate (HEPA) filters are also provided to cleanse the air returned from the shower room, such filters being effective in trapping particulates 0.3 microns in diameter and larger.

The apertures in one type of shower room take the form of a pair of coplanar slots located in opposing walls, and extending vertically from a point a few feet high to a point approximately five feet high. To correctly utilize this type of air shower, a worker opens the entrance door, enters the shower room, positions himself or herself between the slots, raises his or her arms and turns in a complete circle. The blower forces a stream of generally laminar air through each slot, into the shower room and against the person to dislodge particles from the person's body. Some of the particulates are immediately entrained in the return flow of air and drawn through the floor and the filter, and other of the dislodged particulates float into the air within the shower room, are contained by the walls and ceiling of the shower room and most are eventually entrained in the return flow of air and filtered. However, some of these other particulates may escape from the shower room when the worker exits.

Another similar type of air shower uses a group of nozzles located on the ceiling and walls of the associated shower room instead of the vertical slots to direct streams of air against a user.

Air showers of the types described above are general purpose apparatuses for cleaning one's body and do not concentrate on the hands and feet which, as discussed above, are particular sources of repeated contamination. Also, the shower rooms take up many square feet of floor space and the process of utilizing the air showers, from the time the user opens the entrance door to the time the worker exits the shower room, usually requires 30 seconds or more and is inconvenient. Furthermore, the doors of the type of air shower room discussed above are opened manually with handles, which handles provide a source of contamination.

Cleaning and heat-shrinking apparatuses for thermoplastic gloves are presently known which comprise a blower, a high-efficiency particulate filter located between the blower and the object to be cleaned, and a heater to heat the blown air before it reaches the object. The hot air shrinks gloves worn by a user to improve their fit, trap particulates, and dislodge particulates from the gloves. However, the air blown by the blower is not recirculated and no air curtain is provided to block the dislodged particulates so that the dislodged particulates enter the surrounding environment. Consequently, such a device is usually installed outside of a clean room.

There are other objects used in clean rooms which are contaminated with particulates and require cleaning, for example, parts used to fabricate a product and wipes used to clean furniture, equipment and such fabrication parts. Presently, the wipes are discarded after use.

Accordingly, a general aim of the invention is to provide a cleaning apparatus which effectively removes particulates from objects such as gloved hands, clad feet, wipes and fabrication parts and prevents the particulates from re-entering a workroom.

Another general aim of the invention is to provide a cleaning apparatus of the foregoing type which removes the particulates quickly with minimal inconvenience to the user.

A more specific aim of the invention is to provide apparatuses of the foregoing types which are more compact than a conventional air shower and concentrate their cleaning efforts on objects which are small compared to a worker's entire body.

Another specific aim of the invention is to provide cleaning apparatuses of the foregoing types which remove particulates 0.3 microns in diameter and larger.

Still another specific aim of the invention is to provide a cleaning system which is specially adapted to remove particulates from large quantities of wipes.

Other aims of the invention will become apparent from the following detailed descriptions and drawings.

SUMMARY OF THE INVENTION

The invention resides in an apparatus for removing particulates from an object, which apparatus comprises a cleaning chamber which is open on at least one side and receives the object and means for developing a stream of air within the cleaning chamber to remove particulates from the object. According to one feature of the invention, the apparatus further comprises means for developing a curtain of air which covers the opening to the cleaning chamber, the curtain of air preventing such removed particulates from escaping from the cleaning apparatus into the surrounding environment. According to another feature of the invention, the apparatus includes means for developing a second stream of air within the cleaning chamber to remove particulates from the object, the second stream of air converging upon the first stream of air in the vicinity of the object causing turbulence, which turbulence facilitates the removal of particulates from the object.

According to another feature of the invention, means are provided within the cleaning chamber to agitate wipes, loose gloves and loose booties, and other limp objects and, according to still another feature of the invention, conveyor means are provided to carry wipes and other such limp objects into and out of a cleaning chamber to automate the cleaning process.

BRIEF DESCRIPTION OF THE DRAWINGS

FIG. 17 is a perspective view of another particulate cleaning apparatus embodying the invention.

DETAILED DESCRIPTION OF THE PREFERRED EMBODIMENTS

Figure 1:
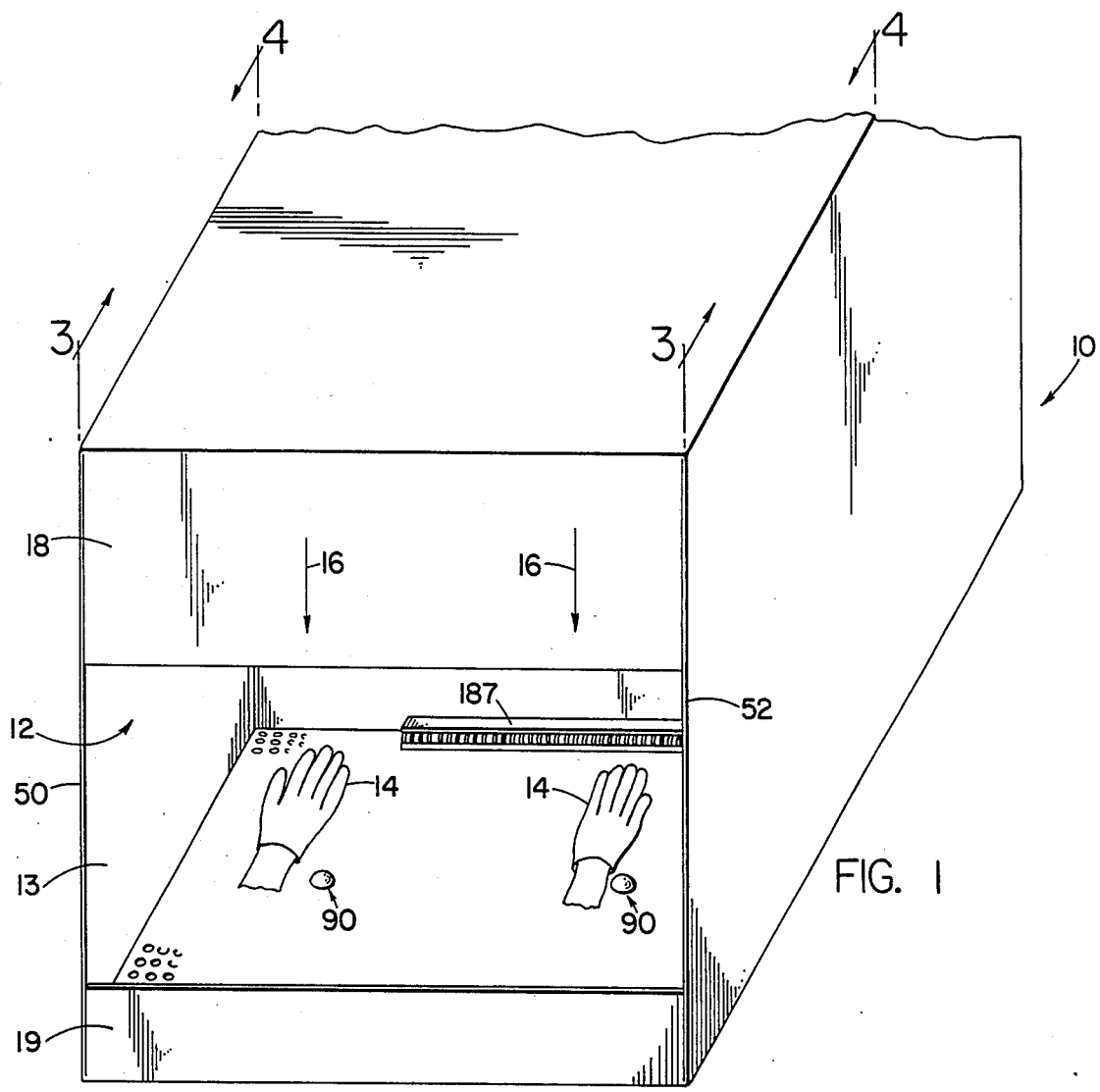
FIG. 1 is a perspective view of a cleaning apparatus embodying the invention.

Turning now to the drawings, FIG. 1 shows a particulate cleaning apparatus generally designated 10 which embodies the present invention. The apparatus 10 is generally box-shaped and small enough, for example, 2'×2'×2' to fit on a desk top. It has a cleaning chamber 12 with a window opening 13 at the front to receive an object such as a person's gloved hands 14,14 (as shown), handheld parts or parts placed within the chamber. The cleaning chamber 12 and the window opening 13 are also large enough to allow a user to insert both hands and a package of gloves, open the package and don the gloves. Arrows 16,16 are inscribed on the box to indicate the proper placement of the hands or other objects within the cleaning chamber 12 for cleaning purposes. In general, air is forced downwardly from a portion 18 of the apparatus 10 which defines an upper limit to the cleaning chamber 12 and is returned via a portion 19 of the apparatus 10 which defines a lower limit to the cleaning chamber.

Figure 2:
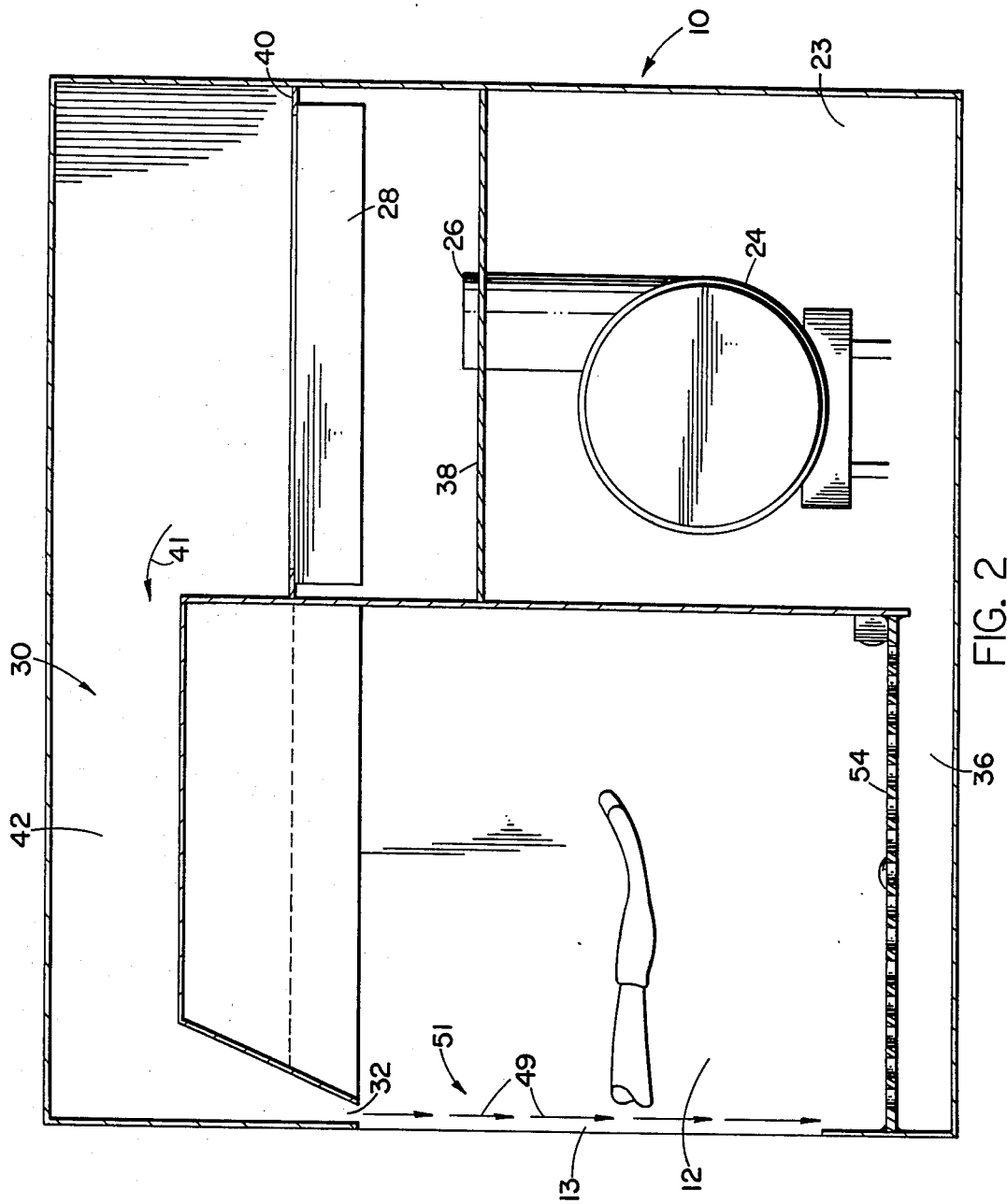
FIG. 2 is a side sectional view of the cleaning apparatus of FIG. 1.
Figure 3:
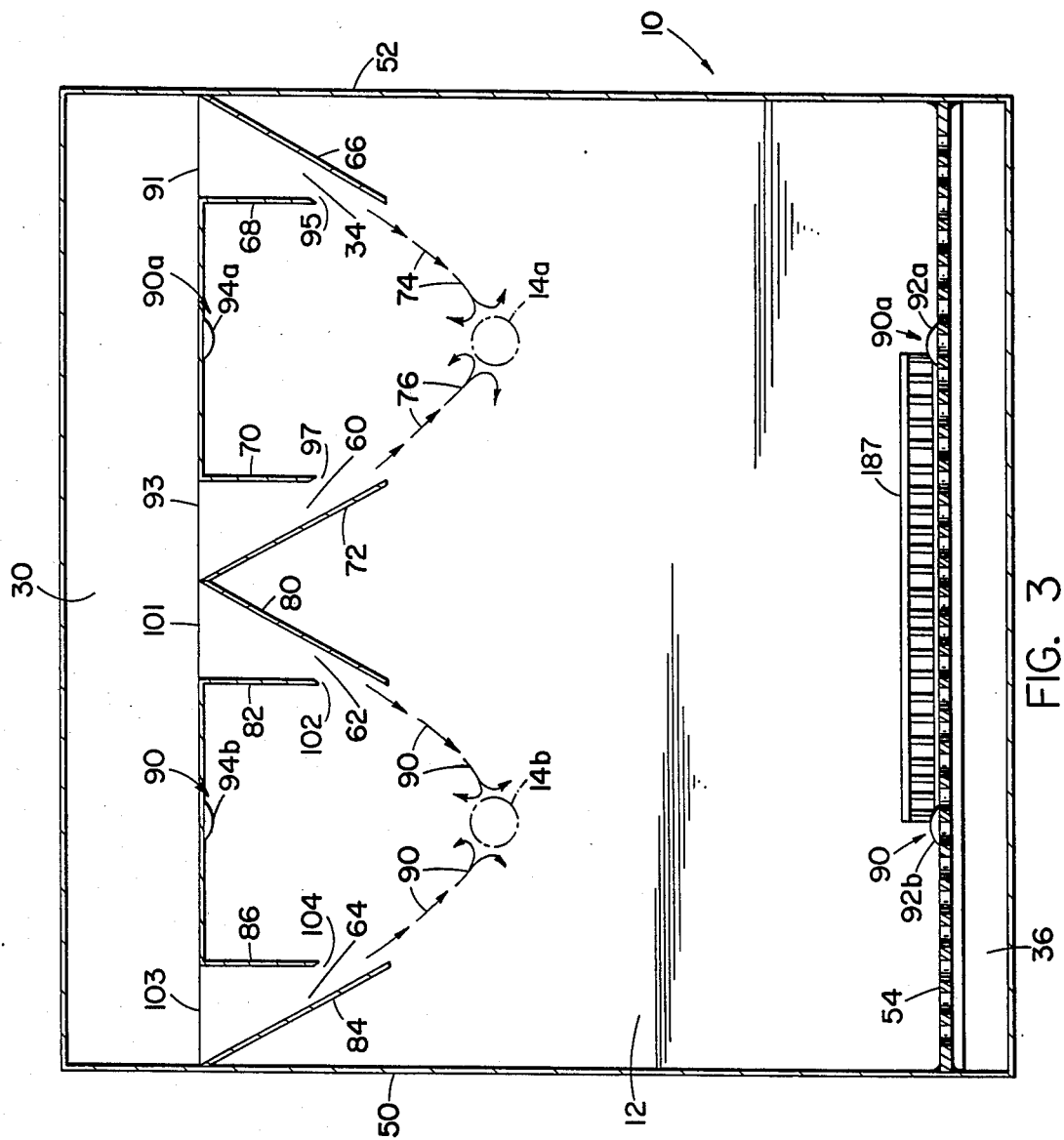
FIG. 3 is a front sectional view of the cleaning apparatus of FIG. 1 taken along the plane 3,3.
Figure 4:
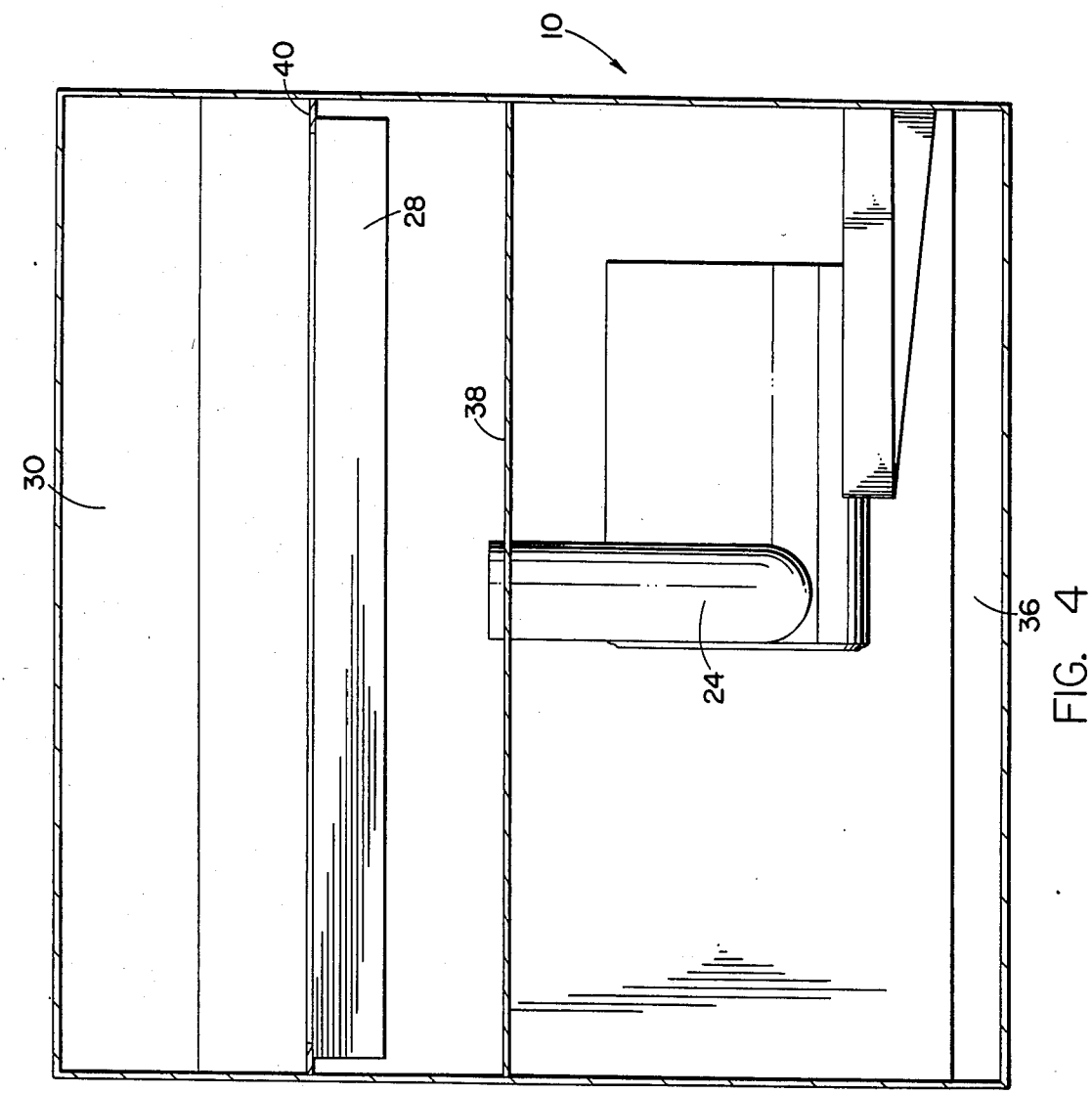
FIG. 4 is a rear sectional view of the cleaning apparatus of FIG. 1 taken along the plane 4,4.

As shown more clearly in FIGS. 2 and 3, the apparatus 10 includes a blower 24 located in a rear chamber 23, a diffuser 26 located above the blower, a HEPA filter 28 located above the diffuser and spaced a few inches therefrom, an air delivery plenum 30 leading forwardly from the HEPA filter, tapered channels 32, 34, 60, 62 and 64 which direct and accelerate air from the air delivery plenum into the cleaning chamber 12, and an air return chase 36 leading back to the blower 24.

By way of example, the blower 24 is rated at one-fifth horsepower and 1000 cubic feet per minute of air when unimpaired and 550 cubic feet per minute when impaired to the extent of a one inch of mercury static pressure differential. The mouth of the blower 24 abuts a divider 38 having an aperture above the mouth, and the diffuser 26 is supported on the other side of the divider 28 adjacent the mouth of the blower. The diffuser has a conventional design and includes apertures which disperse the blown air against much of the underside of the HEPA filter 28. The filter 28 is mounted to a rectangular filter frame 40, comprises woven fibers and, by way of example, is two feet long, one foot wide and 3-¼ inches thick and causes a one inch of mercury static pressure differential between its two faces. By way of example, the HEPA filter 28 is rated to trap particulates 0.3 microns in diameter and larger, but finer HEPA filters are available, ones which trap particulates down to 0.1 microns. The finer the HEPA filter the better the performance of the apparatus 10; however, the higher the cost. It is presumed that as technology progresses, HEPA filters will be available at reasonable cost which trap smaller and smaller particulates.

Air proceeds upwardly from the filter 28 at a speed greater than 100 feet per minute. Then, the air proceeds forwardly through a forward portion 42 of the air delivery plenum 30 as indicated by an arrow 41, and is accelerated because the forward portion 42 has a smaller cross sectional area than the face of the filter 28, the cross sectional area of the forward portion 42 being that in the vertical plane. Next, some of the blown air proceeds through the channel 32 which channel extends laterally from a left wall 50 to a right wall 52 of the apparatus 10 and tapers vertically, by way of example, from a three inch width to a one-fourth inch width. (See FIG. 2) The speed of the air increases through the tapered channel to approximately 600 feet per minute and proceeds downwardly as a curtain of air 51, as indicated by arrows 49,49, which curtain completely covers the front window opening 13 of the cleaning chamber 12 and acts as a barrier between the cleaning chamber and the rest of the clean room. The curtain of air 51 proceeds through perforations in a metal sheet 54 at the bottom of the cleaning chamber and into the air return chase 36.

Figure 5:
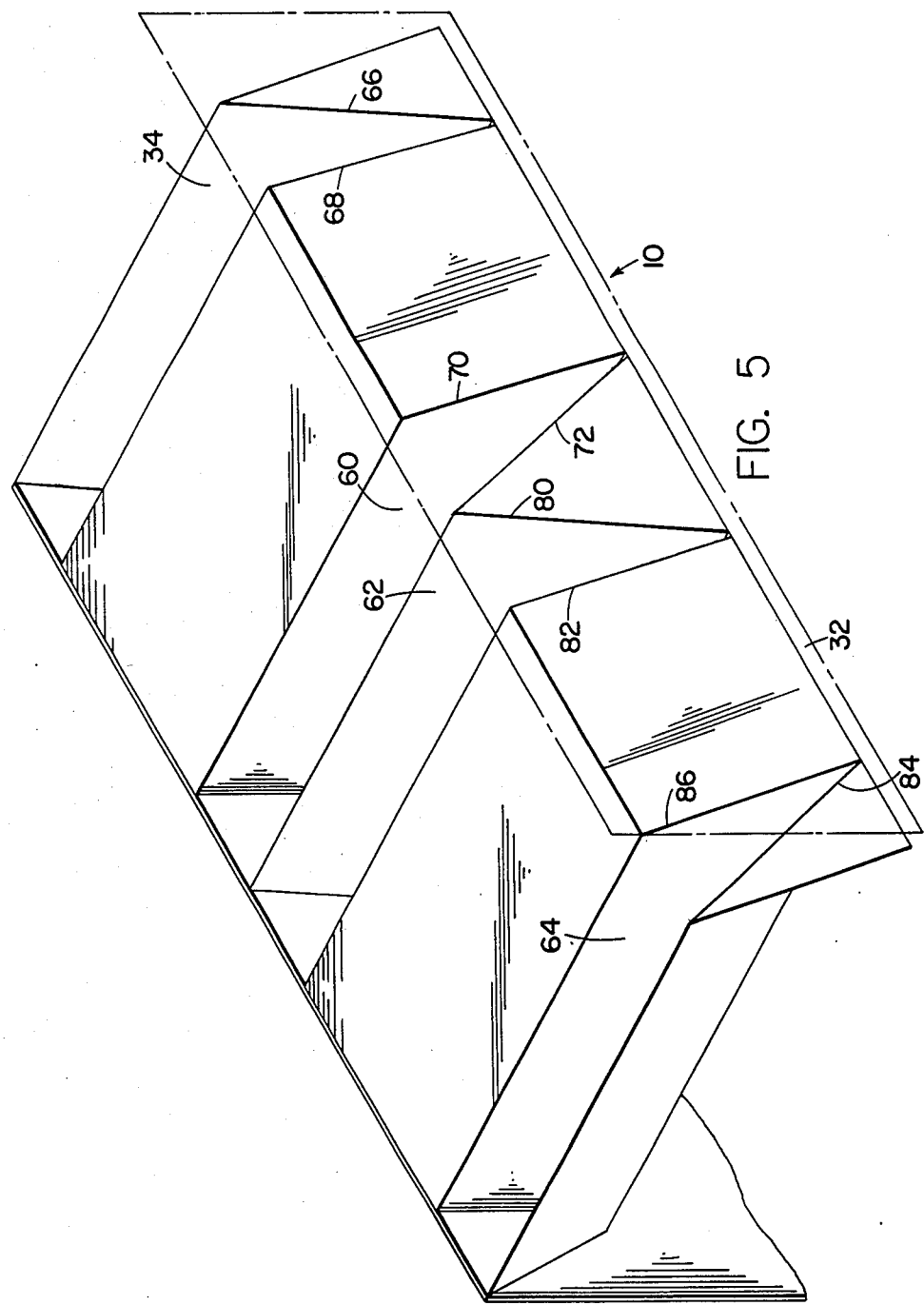
FIG. 5 is a perspective view of channels which develop air streams and air curtains within the cleaning apparatus of FIG. 1.

As shown in FIGS. 3 and 5, the channel 34 is formed by a panel or wall 68 which is vertical and a panel or wall 66 which angles away from the side wall 52, and the channel 60 is formed by a panel or wall 70 which is vertical and a panel or wall 72 which angles towards the side wall 52. Both channels communicate with the air delivery plenum 30 by openings 91 and 93 at the top and with the cleaning chamber 12 by openings 95 and 97 respectively at the bottom. By way of example, the top openings 91 and 93 are three inches wide and the bottom openings 95 and 97 are one-fourth inch wide. Because of the dimension of the channels 34 and 60, air accelerates from the air delivery plenum 30 through the channels 34 and 60 to approximately 600 feet per second. Each of the channels 34 and 60 extends front-to-back from a point directly behind the air curtain 51 to the rearward limit of the cleaning chamber 12. Hence, as indicated by arrows 74,74, the channel 34 develops a wide stream of air, initially laminar, which proceeds straight downwardly, laterally inwardly of the cleaning chamber 12, parallel to the air curtain 51 and towards a cleaning zone occupied by the right hand 14 indicated as a. As indicated by arrows 76,76, the channel 60 develops a wide stream of air, initially laminar, which proceeds downwardly, laterally outwardly of the cleaning chamber, parallel to the air curtain 51, towards a cleaning zone occupied by the hand 14a and towards the stream of air developed by the channel 34. Hence, the two streams of air converge upon the hand 14a and upon one another in the vicinity of the hand 14a and thereby cause each other's air flows to become turbulent.

Similarly, the channel 62 is defined by a panel or wall 82 which is vertical and a panel or wall 80 which angles towards the side wall 50, and the channel 64 is defined by a panel or wall 86 which is vertical and a panel or wall 84 which angles away from the side wall 50. Both of the channels 62 and 64 communicate with the air delivery plenum 30 by openings 101 and 103 at the top and with the cleaning chamber 12 by openings 102 and 104, respectively, at the bottom. By way of example, the top openings 101 and 103 are three inches wide and the bottom openings 102 and 104 are one-fourth inch wide. The walls 80, 82, 84 and 86 extend from a point directly behind the air curtain 51 to the rearward limit of the cleaning chamber 12 and therefore develop two relatively wide streams of air, initially laminar, which proceed straight downwardly parallel to the air curtains 51, and as indicated by arrows 90,90 and 92,92, converge upon the left hand 14 indicated as b and upon one another. The two intersecting air streams from the channels 62 and 64 cause turbulent air to flow against and flow in the vicinity of the hand 14b.

It is believed that the turbulence in the air created by the intersection of the air streams from the channels 34 and 60 at the surface of the gloved hand 14a and from the channels 62 and 64 at the surface of the gloved hand 14b facilitates the breaking of surface bonds between particulates located on the gloves and the gloves themselves and the lifting of particulates from the gloves and therefore facilitates the removal of particulates from the gloves or other objects similarly situated. Movement of the hands within the cleaning chamber also facilitates the removal of particulates from the gloves. Most of the removed particulates are immediately entrained in the return air flow of the air streams of the channels 34, 60, 62, and 64 and drawn downwardly through the perforations in the sheet 54, into the air return chase 36 and back into the blower 24 and then forced into the HEPA filter 28 where they are trapped. However, some of the freed particulates may initially avoid the return air flow and float for a short time within the cleaning chamber 12. Some of the avoiding particulates may migrate towards the front window opening 13 of the cleaning chamber 12, in which case they are entrained by the air curtain 51, and drawn downwardly into the air return chase 36 and forced into the HEPA filter 28. The other particulates which initially avoid the return air flow of the channels 34, 60, 62, and 64 are eventually returned by them.

As shown schematically in FIGS. 1 and 3, photoelectric eyes 90,90 are installed within the cleaning apparatus 10 to activate the blower 24. Each electric eye 90 includes a photo emitter 92 and a photosensor 94 in the path of light emitted by the photo emitter. The photo emitter 92 indicated as a is supported on the perforated sheet 54 approximately halfway into the chamber 12 directly beneath the line of intersection of the air streams developed by the channels 62 and 64, and the associated photo sensor 94 indicated as a is supported on the underside of the upper portion 18 directly above the photo emitter 92a. Similarly, the photo emitter 92 indicated as b is supported on the perforated sheet 54 approximately halfway into the cleaning chamber 12 directly below the line of intersection of the air streams developed by the channels 62 and 64, and the associated photo sensor 94 indicated as b is supported on the underside of the upper portion 18 directly above the photo emitter 92b. Hence, when an object is located well within the cleaning chamber 12 at either cleaning position, the respective photoelectric eye 90 is activated.

Because the electric eyes 90,90 are located approximately half the way into the cleaning chamber 12, the blower is not activated until the contaminated object, either the gloved hand or other object is well within the cleaning chamber 12 and behind the air curtain 51. Consequently, particulates which are dislodged from the contaminated object cannot escape into the workroom. If the blower 24 was instead activated while the gloved hands or other objects were being inserted, then some particulates may be dislodged by the air curtain 51, avoid the return air flow of the air curtain and float into the workroom. The use of the electric eyes also saves energy.

Figure 6:
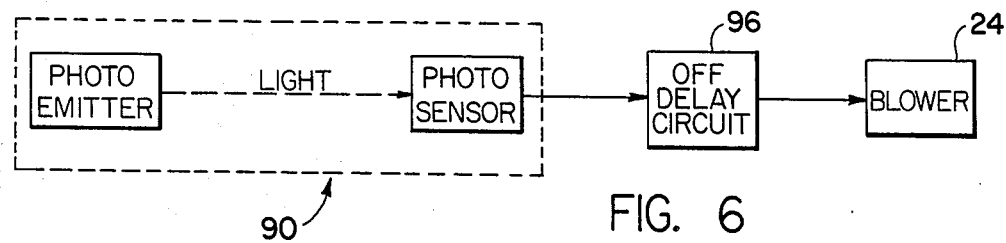
FIG. 6 is a schematic, block diagram of a photoelectric eye and a delaying circuit used to control a blower within the cleaning apparatus of FIG. 1.

As illustrated schematically by FIG. 6, an OFF-delay timing circuit 96 is provided to allow the blower 24 to remain on for one or more seconds after the hand 14 or other object is removed the path of either electric eye 90. This delay allows the apparatus 10 to purge the cleaning chamber 12 of particulates once the hand 14 or other object is withdrawn so that any particulates freed from the glove or other object at the time of withdrawal or shortly before, remain behind the air curtain 51 and do not escape into the work room.

As shown in FIGS. 1 and 3, a heating coil 187 is included within the cleaning chamber 12, which heating coil is an optional feature of the apparatus 10. It is used to heat and thereby shrink thermoplastic gloves worn by a person, which shrinkage improves the fit of the gloves and traps particulates located on their surface. By way of example, the heating coil delivers 600 watts of heat and is turned on at the onset of a workday and for a short time after a lunch hour to treat newly donned gloves.

FIGS. 7 through 10 illustrate another embodiment of the invention generally designated 210, which embodiment is similar to the cleaning apparatus 10 except that the apparatus 210 is approximately one-half the size. Essentially, the cleaning apparatus 210 is the same as the right half of the cleaning apparatus 10 except that the apparatus 210 includes a blower 224 in place of the blower 24, the blower 224 having half the power. Also, the apparatus 224 is operated in a similar fashion to that of the apparatus 10 except that the apparatus 224 is designed to accommodate only one hand 14 at a time, objects held by the one hand, or a lesser amount of objects placed within the cleaning chamber.

Figure 9:
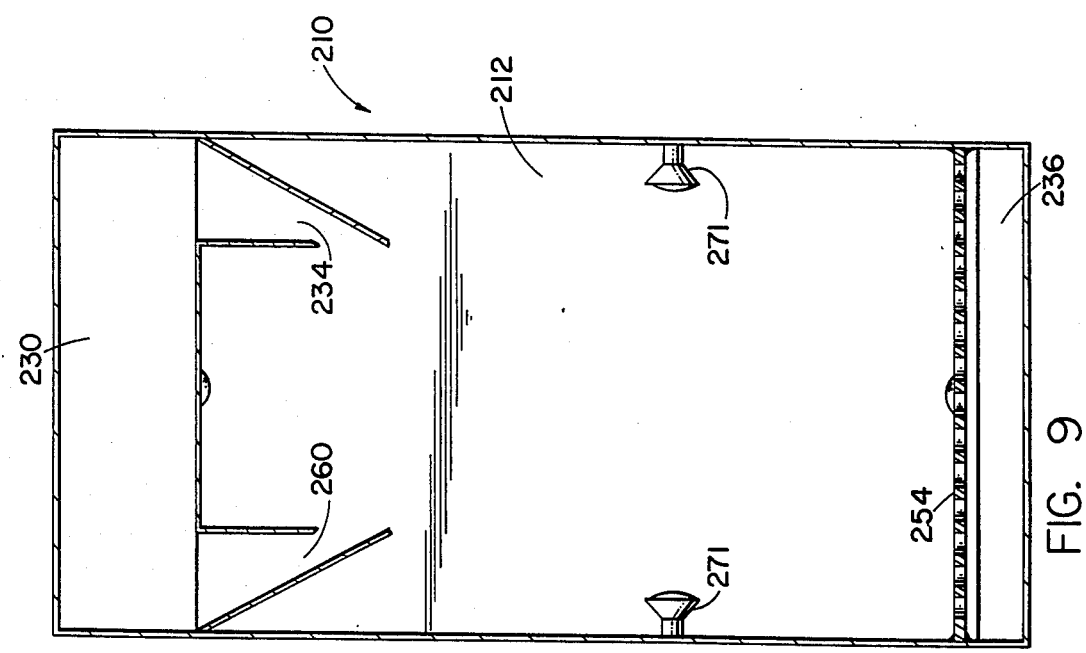
FIG. 9 is a front sectional view of the cleaning apparatus of FIG. 7 taken along the plane 9,9.
Figure 8:
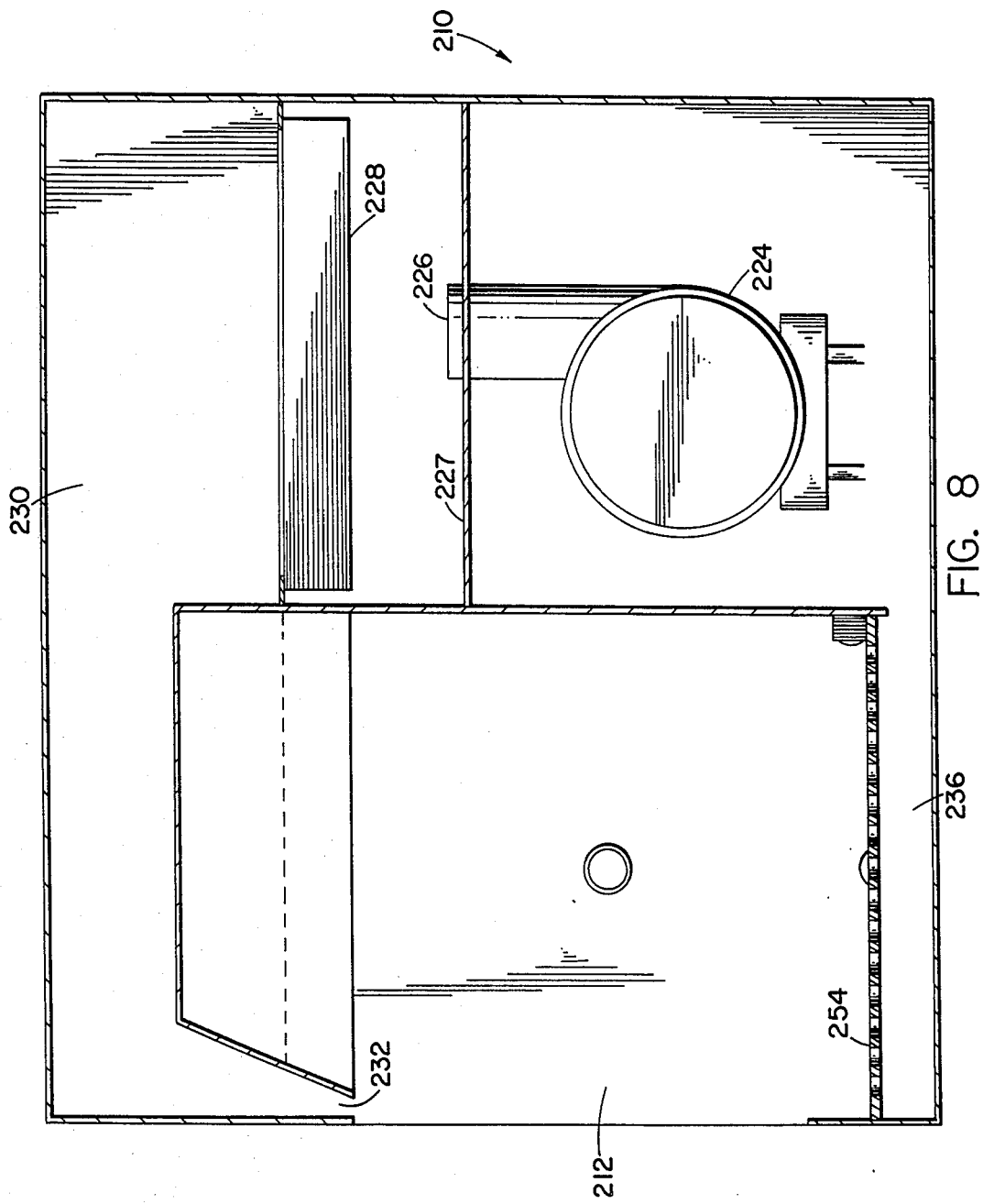
FIG. 8 is a side sectional view of the cleaning apparatus of FIG. 7.

Air blown by the blower 224 passes through perforations in a sheet 227, an air disperser 226, a HEPA filter 228, an air delivery plenum 230, tapered channels 232, 234 and 260, a cleaning chamber 212, perforations in a sheet 254, and a return air chase 236. Because of the half size of the cleaning apparatus 210, the HEPA filter 228 is smaller, for example, $2' \times 1' \times 3\frac{1}{4}''$, and the length of the channel 232 is approximately half that of the channel 32. The length of the channel 234 is the same as that of the channel 260 and is the same as those of the channels 34 and 60, and the widths of the air delivery chase 230 and the air return chase 236 are approximately half those of the air delivery plenum 30 and the air return chase 36, respectively. As shown in FIG. 9, the cleaning apparatus 210 includes only one pair of intersecting air streams, those developed by the channels 234 and 260.

Figure 7:
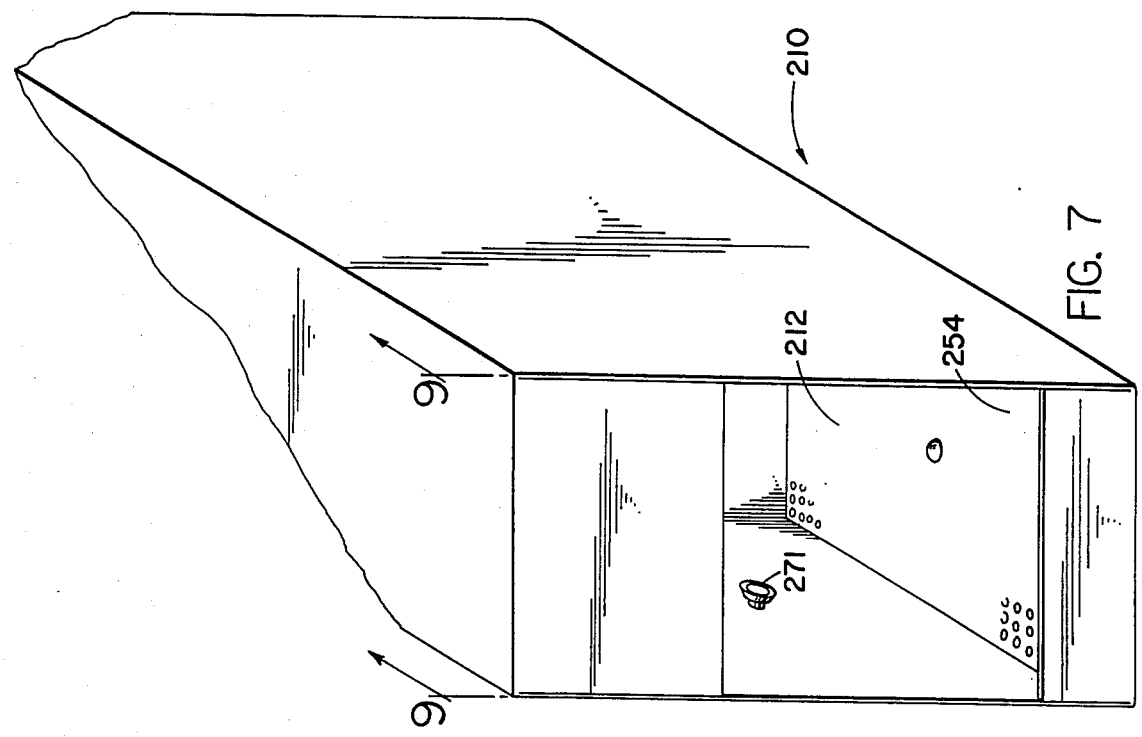
FIG. 7 is a perspective view of another cleaning apparatus embodying the invention.

As shown in FIG. 7, the cleaning apparatus 210 also includes a lamp 271 which radiates black light into the cleaning chamber 212, which black light exposes particulates to the naked eye. The purpose of the black light is to inform the user when his or her gloves or other objects contained within the cleaning chamber 212 are clean and to motivate workers to use the cleaning apparatus 210; if they can see particles being removed, they will be more apt to utilize it.

Figure 10:
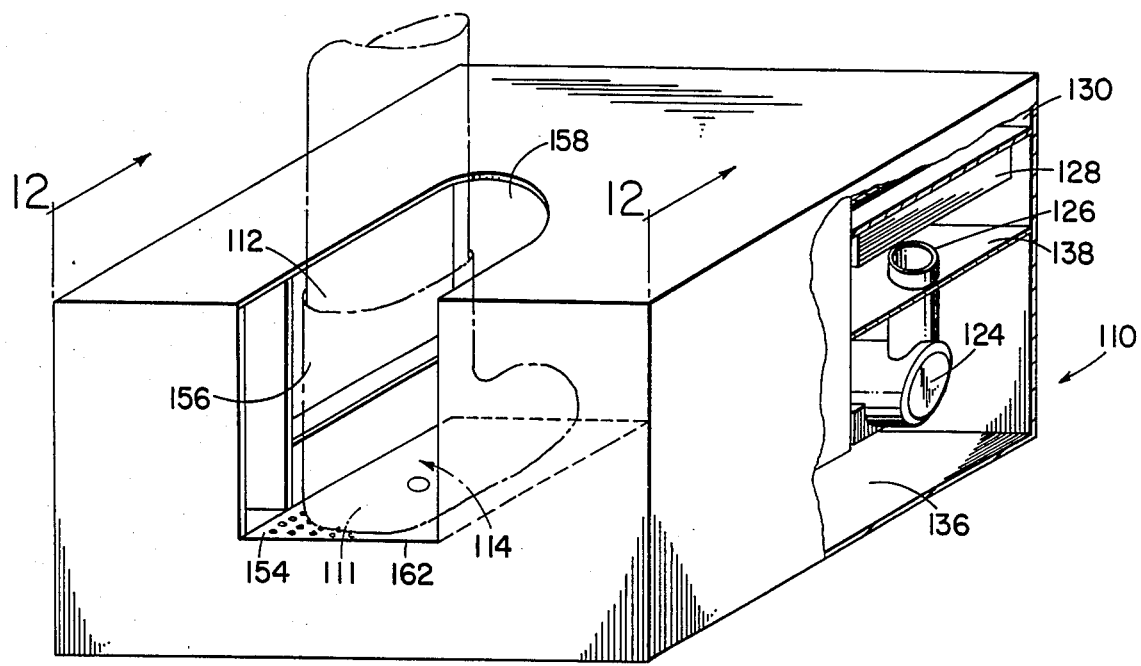
FIG. 10 is a perspective view of another cleaning apparatus embodying the invention.

FIG. 10 illustrates another embodiment of the invention generally designated 110, which embodiment is adapted to accommodate and clean particulates from feet, typically clad with disposable booties or slippers. The booties or slippers may be contaminated by their removal from a package and the donning of them or from subsequent contact with the floor, furniture and other sources of particulates.

Figure 12:
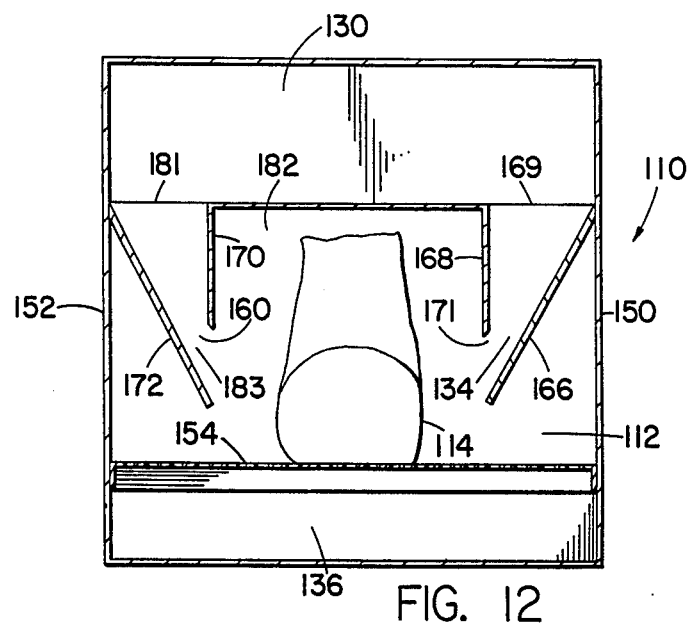
FIG. 12 is a front sectional view of the cleaning apparatus of FIG. 10 taken along the plane 12,12.
Figure 11:
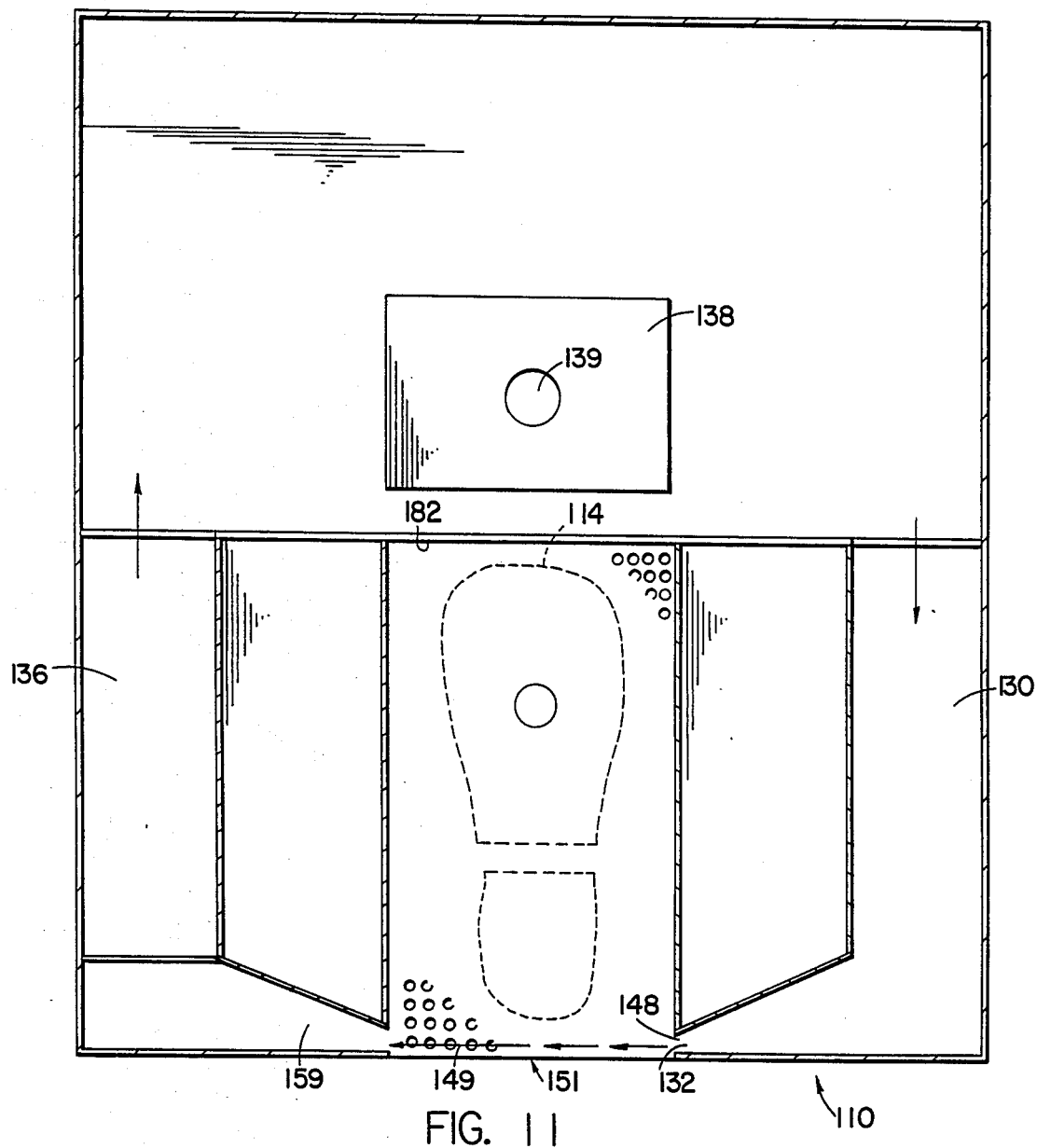
FIG. 11 is a top sectional view of the cleaning apparatus of FIG. 10.

More specifically, the apparatus 110 comprises a cleaning chamber 112 in which a foot 114 clad with a bootie 111 is inserted. The cleaning chamber 112 has a rectangular window opening 156 in the front and a "U" shaped, adjoining window opening 158 on the top. As shown in FIGS. 11 and 12, the apparatus 110 includes a blower 124, an air disperser 126, a HEPA filter 128, an air delivery plenum 130, air delivery channels 132, 134 and 160, a perforated metal sheet 154 and an air return chase 136. By way of example, the blower 124 is rated at onetenth horsepower, 500 cubic feet per minute when unimpaired and 275 cubic feet per minute when impaired by a filter such as the filter 128 which causes a one-inch of mercury static pressure differential across its two faces. The blower 124 is supported against a divider 138 having an aperture 139 above the mouth of the blower. The disperser 126 is identical to the disperser 26 described above and the HEPA filter 128 is identical to the HEPA filter 228. The air delivery plenum 130 routes air, blown by the blower 124, to the channel 132, which channel accelerates the air to approximately 600 feet per minute at its slotted opening 148. The channel 132, as well as the slotted opening 148, extend from the perforated sheet 154 to a roof 164 of the cleaning apparatus 110. Hence, the channel 132 develops a curtain of air 151, as indicated by arrows 149, which flows right to left across the front opening of the cleaning chamber 112. The curtain of air covers the front opening forming a barrier, and is returned as indicated by an arrow 196 via a tapered channel 159 and the return air chase 136.

As shown clearly in FIG. 12, the channel 134 is defined by a wall 166 which angles a way from a side wall 150 and a wall 168 which extends vertically, and communicates with the air delivery plenum 130 by an opening 169 and with the cleaning chamber 112 by a slotted opening 171. The walls 166 and 168 extend from a point behind the air curtain 151 to a rearward wall 182 of the cleaning chamber 112. The channel 160 is defined by a wall 172 which angles away from a wall 152 and a wall 170 which extends vertically, and communicates with the air delivery plenum by an opening 181 and with the cleaning chamber 112 by a slotted opening 183. The walls 170 and 172 also extend from a point behind the air curtain 151 to the rearward wall 182 of the cleaning chamber 112. By way of example, the openings 169 and 181 are three inches wide and the openings 171 and 183 are onefourth inch wide.

Figure 13:
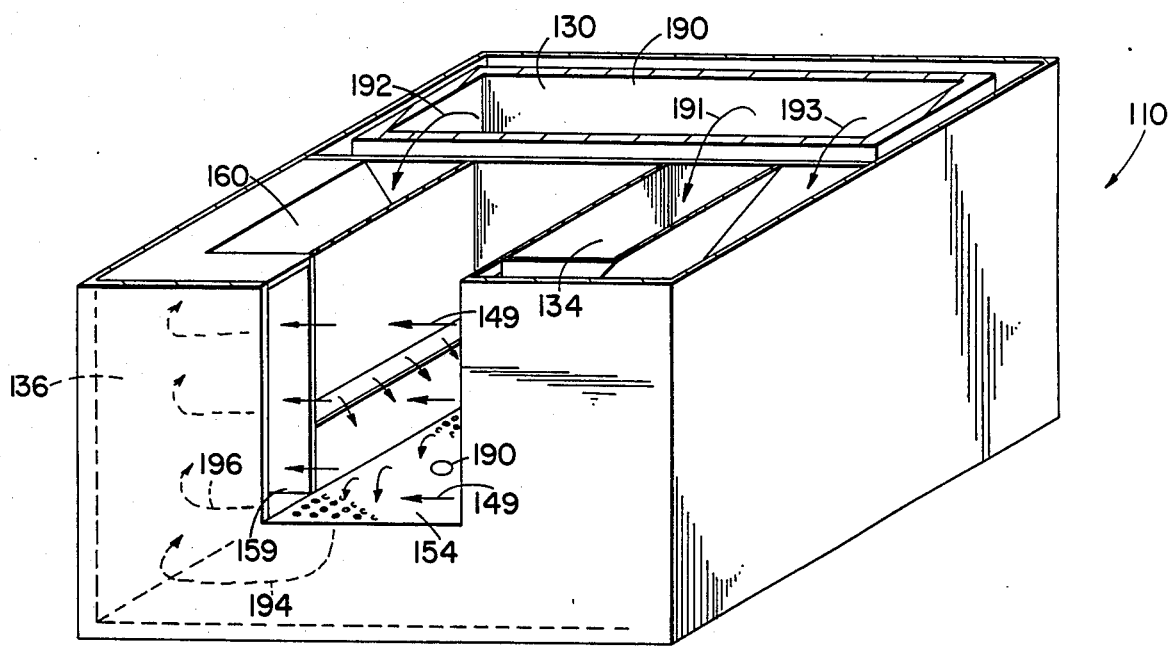
FIG. 13 is a perspective view of the interior construction of the cleaning apparatus of FIG. 10.

As shown in FIG. 13 when the blower 124 is activated, air is forced upwardly through a rear portion 190 of the air delivery plenum 130 and, as indicated by an arrow 191, into the channel 134, as indicated by an arrow 192 into the channel 160, and as indicated by an arrow 193 into the channel 132, and accelerated within the channels to a speed of approximately 600 feet per minute. Air streams developed by the channels 134 and 160 are laminar when they leave the slotted openings 171 and 183 and converge upon one another and the foot 114, which convergence causes air turbulence in the vicinity of the foot 114. The turbulent air, as discussed above, and any remaining laminar air dislodge particulates from the bootie 111. The particulates are drawn through perforations in the plate 154, into the air return chase 136 as indicated by arrows 194,194 and rearwardly into the blower 124, and later blown into the HEPA filter 128. The air curtain 151 prevents particulates which avoid the air streams of the channels 134 and 160 from escaping from the cleaning chamber into the work area through the opening of the box. In addition, an ankle 115 of the user which engages the heel-shaped border of the top opening blocks much of the top opening of the cleaning chamber, and the front space between the rear of the ankle and the front opening of the box is acted upon by the air curtain, causing particulates located therein to be drawn into the air return chase 136.

The apparatus 110 further includes a photoelectric eye 190 and associated delaying circuitry which operates as does the photoelectric eye 90 to activate the blower 124 once the foot is inserted and to de-activate the blower 124 a few seconds after the foot is withdrawn.

Figure 14:
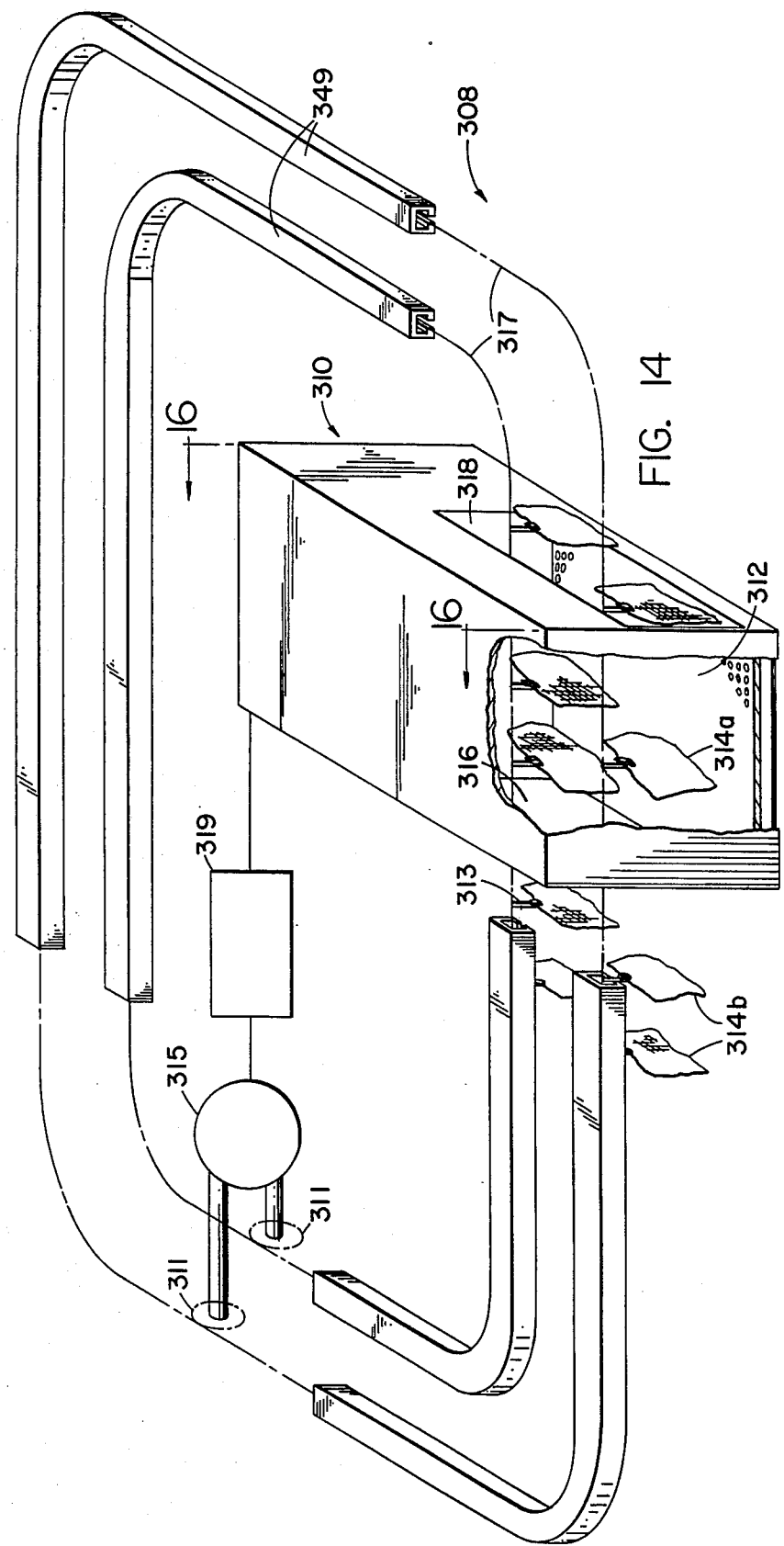
FIG. 14 is a perspective view of a particulate cleaning system embodying the invention.

FIG. 14 illustrates a cleaning system generally designated 308 embodying the invention, which system comprises endless, movable conveyor chains 317,317, tracks 349,349 which supports the chains 317,317, timing pulleys 311,311 which support the chains, a DC motor 315 for driving the timing pulleys, clamps 313,313 for hanging wipes 314,314, loose gloves, loose booties, or other limp or rigid objects from the chains 317,317, a cleaning apparatus 310, including a blower 324 (FIG. 16) for cleaning the wipes 314,314 carried by the clamps 313,313, and a controller 319 for activating the motor 315 and the blower 324 according to a routine. The cleaning apparatus 310 includes a cleaning chamber 312 extending laterally from one side 330 to an opposite side 332, an entrance window opening 316 of the cleaning chamber 312 through which the wipes 314,314 enter the cleaning chamber and an exit window opening 318 of the cleaning chamber through which the wipes exit the cleaning chamber after being cleaned.

Figure 15:
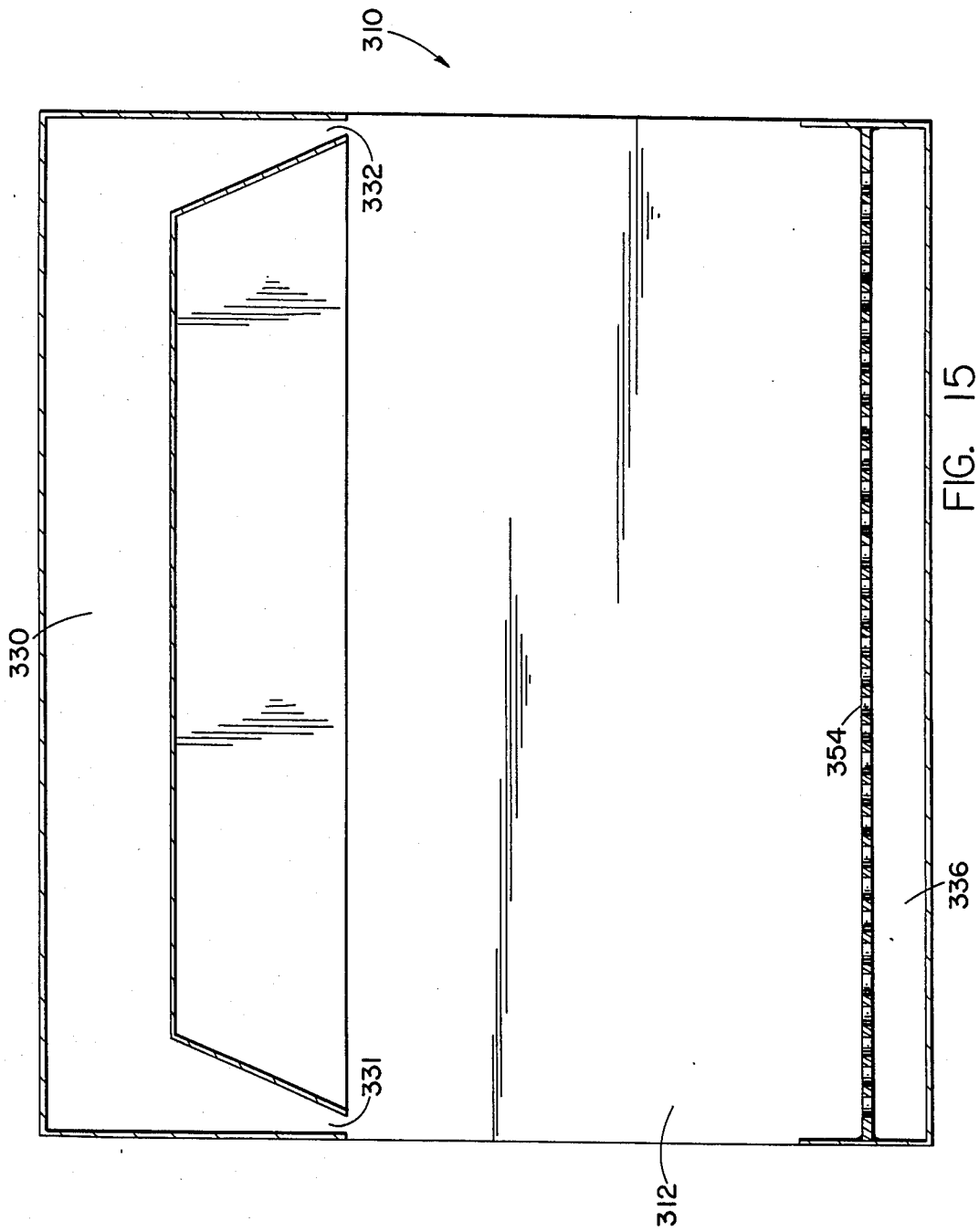
FIG. 15 is a front sectional view of a particulate cleaning apparatus within the particulate cleaning system of FIG. 14.
Figure 16:
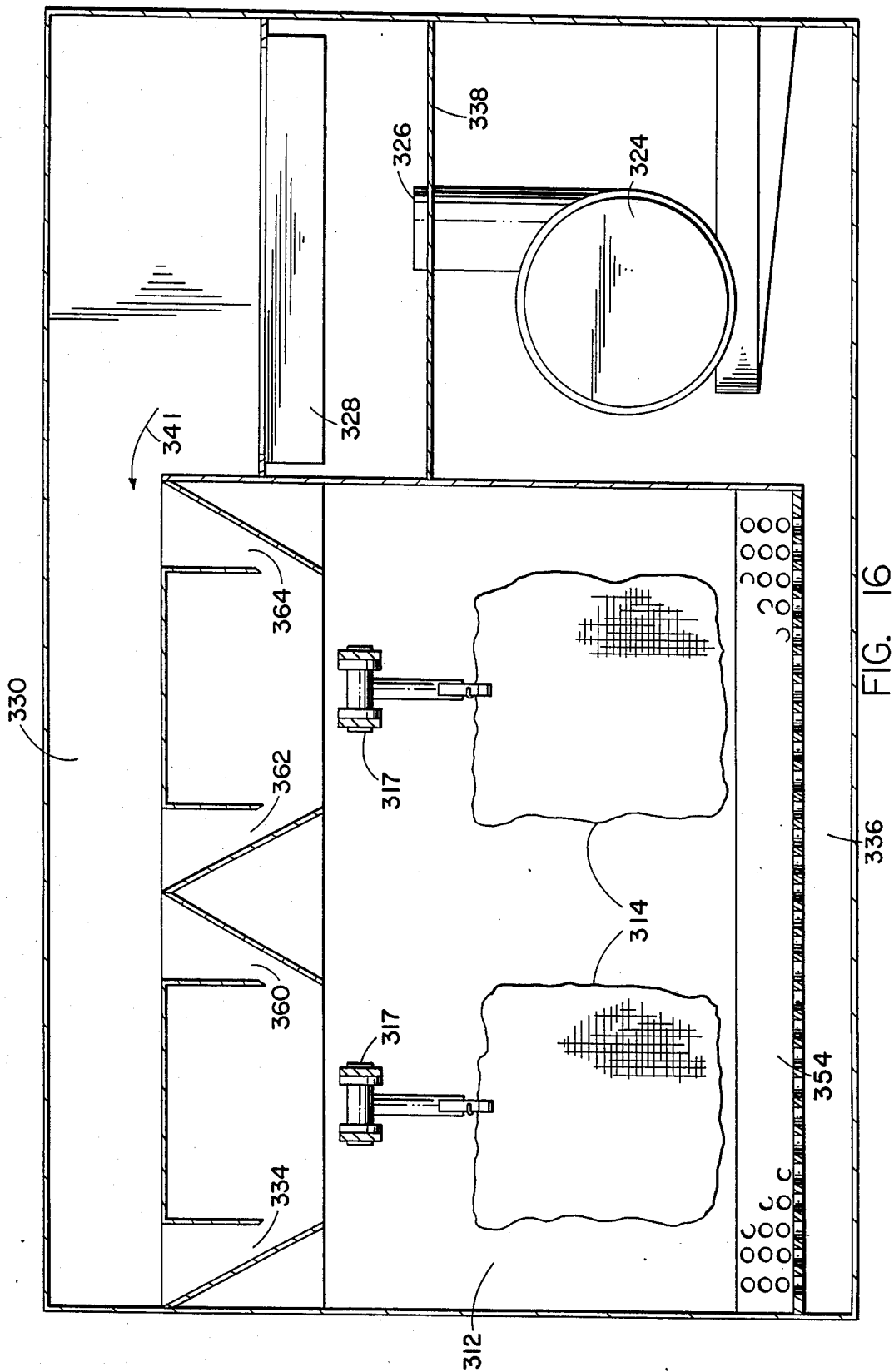
FIG. 16 is a side sectional view of the particulate cleaning apparatus within the particulate cleaning system of FIG. 14 taken along the plane 16,16.

As shown more clearly in FIG. 16, the blower 324 is located in a rear compartment of the apparatus 310, and the apparatus 310 further comprises a diffuser 326 located above the blower, a HEPA filter 328 located above the diffuser and spaced a few inches therefrom, an air delivery plenum 330 leading forwardly from the HEPA filter, tapered channels 331, 332, 334, 360, 362 and 364 (FIG. 15) which direct and accelerate air from the air delivery plenum into the cleaning chamber 312, and an air return chase 336 leading back to the blower 324.

The blower 324 is identical to the blower 24, the mouth of the blower 324 abuts a directs 338, and the diffuser 326 is supported on the other side of the perforated sheet adjacent the mouth of the blower. The diffuser 326 is identical to the diffuser 26 and serves to disperse air about the bottom of the HEPA filter 328 which filter 328 is identical to the HEPA filter 28 and is mounted to a rectangular filter frame 340. As indicated by an arrow 341, air proceeds upwardly from the blower 324, through the disperser 326 and through the HEPA filter 328 and then forwardly through the air delivery plenum 330. Then, the air proceeds downwardly through the tapered channels 331, 332, 334, 360, 362 and 364. In a manner analogous to the development of the curtain 51 of air in the cleaning apparatus 10, the channels 331 and 332 develop curtains of air which cover the entrance window 316 and the exit window 318, respectively. In addition, the tapered channels 334 and 360 develop streams of air which converge upon one another and upon the wipes 314,314 indicated as a located within the cleaning chamber, and the tapered channels 362 and 364 develop streams of air which converge upon one another and upon the wipes 314a,3-14a. The convergence causes turbulence in the air streams, which turbulence facilitates the removal of particulates from the wipes. The air of the air curtains and the air of the air streams is returned via perforations in the sheet 354 and the return air chase 336, drawn back into the blower 324 and forced through the filter 328 where they are trapped.

To prevent the air curtains from dislodging particulates from the wipes 314,314 as the wipes pass through the windows 316 and 318, the controller 319 shuts off the blower 324 when it directs the motor 315 to advances the chains 317,317 and the wipes 314,314 they carry into the cleaning chamber 312. After, the chains advance the length of the cleaning chamber 312 and a new group of contaminated wipes 314,314 indicated as 314b are moved into the cleaning chamber 312, the controller 319 de-activates the motor 315 and activates the blower 324 to clean the wipes. After a sufficient cleaning time has elapsed, the controller again shuts off the blower 324 and directs the motor 315 to advance the chains 317,317 another such length to move the newly-cleaned wipes 314b,314b through the exit window 318 and beyond the apparatus 310.

FIG. 17 shows another embodiment of the invention generally designated 410, which embodiment is specially adapted to clean wipes 414,414, loose gloves, loose booties, and other limp articles. Except as noted below, the cleaning apparatus 410 is identical to the cleaning apparatus 10 and comprises identically referenced components. The cleaning apparatus 410 further includes a perforated drum 411 supported for rotation within the cleaning chamber 12, a motor 414 which turns the drum 411, an ON/OFF switch 429 which replaces the photoelectric eyes 90,90 and associated delay circuitry, and a timer 430. The drum 411 comprises a front rim 416, a rear rim 418 and a cylindrical grid 420 of wires supported between the two rims.

To clean the wipes 414,414, an operator manually places them in the drum 411 and activates the motor 414 and the blower 24 with the ON/OFF switch 429. Consequently, the wipes 414,414 are tumbled and agitated by the rotation of the drum 411 and struck by the air streams developed by the channels 34, 60, 62 and 64, the forces of the drum agitation and the air streams dislodging particulates from the wipes 414,414. The dislodged particulates are drawn through the grid 420 of wires, the end openings of the drum 411 and the perforations in the sheet 54 and into the air return chase 36, the air curtain 51 insuring that dislodged particulates do not escape from the cleaning apparatus 410 into the work environment. Next, the blower 24 receives the contaminated air and forces it through the HEPA filter 28 trapping the previously dislodged particulates. The timer 430 automatically shuts off the blower 24 and the motor 414 after a predetermined cycle cleaning time.

By the foregoing, cleaning apparatuses for removing particulates from objects have been disclosed. However, numerous modifications and substitutions may be made without deviating from the scope of the invention. For example, if desired for simplicity in construction, the electronic eyes 90,90 and the cleaning apparatus 10 may be omitted and the blower 24 operating continuously throughout a workday. Also, if desired, additional channels may be located within the cleaning apparatuses 10, 210, or 310, which additional channels direct streams of air from right to left or from left to right within the respective cleaning chambers and occur in pairs, the channels of each pair directing their streams of air upon each other and the object to be cleaned. In addition, one or more shelves may be installed within the cleaning chamber 12 to support objects to be cleaned. Therefore, the invention has been disclosed by way of illustration and not by way of limitation.

I claim:

1. An apparatus for removing particulates from an object, said apparatus comprising:

means defining a cleaning chamber for receiving an object and having a constantly open opening allowing an object to be moved at all times freely between said chamber and the external environment surrounding said chamber, means for developing a first stream of air within said cleaning chamber to remove particulates from an object when received within said cleaning chamber, means for developing a curtain of air within said chamber which curtain of air is located adjacent said opening and flows across said opening generally in a plane parallel to said opening to cover said opening and to thereby inhibit particulates removed from an object by said first stream from escaping from said cleaning chamber through said opening, and means for recirculating the air of said curtain and the air of said first stream.

2. An apparatus as set forth in claim 1 further comprising means for filtering the air of said curtain and the air of said first stream to remove particulates having a diameter 0.3 microns and larger.

3. An apparatus as set forth in claim 2 wherein said means for filtering comprises a high efficiency particulate filter.

4. An apparatus as set forth in claim 3 further comprising means for developing a second stream of air within said cleaning chamber to clean particulates from an object, said first and seocnd steams of air converging upon one another at a first cleaning zone and causing turbulence.

5. An apparatus as set forth in claim 4 further comprising means for automatically turning on said first and second streams of air and said curtain of air in response to the presence of an object in said cleaning chamber.

6. An apparatus as set forth in claim 5 further comprising means for turning off said first and second steams of air and an curtain of air at least one second after said object is withdrawn from said cleaning chamber.

7. An apparatus as set forth in claim 5 wherein said means for automatically turning on said first and second streams of air and said curtain of air includes an electric eye for detecting the presence of an object in said cleaning chamber.

8. An apparatus as set forth in claim 4 wherein said means for developing said first stream of air includes means for directing it generally parallel to said curtain of air, and wherein said means for developing said second steam of air includes means for directing it generally parallel to said curtain of air.

9. An apparatus as set forth in claim 8 wherein
said means for recirculating the air of said first stream, said second stream, and said curtain comprises a return air chase having an entrance, and
said means for developing said first stream of air, said means for developing said second stream of air, and said means for developing said curtain of air are located on one side of said cleaning chamber, and said entrance of said return air chase is located on an opposite side of said cleaning chamber.

10. An apparatus as set forth in claim 4 further comprising:
means for developing a third stream of air within said cleaning chamber for cleaning another object, and
means for developing a fourth stream of air within said cleaning chamber for cleaning said other object, said third and fourth streams of air converging upon one another at a second cleaning zone spaced from said first cleaning zone.

11. An apparatus as set forth in claim 3 further comprising means for heating a thermoplastic glove while located within said cleaning chamber to a temperature sufficient to trap particulates located on the surface of said glove.

12. An apparatus as set forth in claim 11 for use with heat shrinkable thermoplastic gloves and wherein said means for heating a thermoplastic glove is capable of heating such a glove to a temperature sufficient to cause it to shrink.

13. An apparatus as set forth in claim 3 wherein said opening is the only opening through which an object may be moved into and out of said cleaning chamber for cleaning.

14. An apparatus as set forth in claim 1 further comprising means for illuminating said cleaning chamber with black light.

15. An apparatus as set forth in claim 1 further comprising means for agitating an object within said cleaning chamber to facilitate the removal of particulates.

16. An apparatus as set forth in claim 15 further comprising means for filtering the air of said curtain and the air of said first stream to remove particulates having a diameter 0.3 microns and larger.

17. An apparatus as set forth in claim 1 wherein said means for developing said first stream of air includes means for directing it generally parallel to said curtain of air.

18. An apparatus as set forth in claim 1 for use in cleaning a person's foot and wherein said means defining said cleaning chamber includes a vertical front wall having an upper horizonal edge and a horizontal top wall extending rearwardly from said upper horizontal edge of said front wall, said opening being in said front wall and said top wall having a rearwardly extending mouth merging with said opening at said upper edge of said front wall, said opening and mouth being of such size and shape as to accommodate a person's foot and the adjacent portion of the person's foreleg, said mouth having a roudned rear boundary to generally mate with a person's foreleg.

19. A system for removing particulates from an object, said system comprising:
means defining a cleaning chamber having first and second opposite sides and having a first constantly open window on said first side and a second constantly open window on said second side,
means for developing a first stream of air within said cleaning chamber to remove particulates from an object when received within said cleaning chamber,
means for developing a first curtain of air within said chamber which curtain of air is located adjacent said first window and flows across said first window generally in a plane parallel to said first window to cover said first window to inhibit particulates removed from an object by said first stream from escaping from said cleaning chamber while nevertheless allowing an object to be moved freely through said first window between said cleaning chamber and the external environment surrounding said chamber
means for developing a second curtain of air within said chamber which curtain of air is located adjacent said second window and flows across said second window generally in a plane parallel to said first window to cover said second window to inhibit particulates removed from an object by said first stream from escaping from said cleaning chamber while nevertheless allowing an object to be moved freely through said second window between said cleaning chamber and the external environment surrounding said chamber, and
means for moving an object into said cleaning chamber through said first window, through said cleaning chamber, and then out of said cleaning chamber through said second window.

20. A system as set forth in claim 19 further comprising means for recirculating the air of said first curtain, the air of said second curtain and the air of said first air stream, and means for filtering the recirculated air to remove particulates.

21. A system as set forth in claim 20 wherein said means for filtering comprises a high efficiency particulate filter.

22. A system as set forth in claim 20 further comprising means for developing a second stream of air within said cleaning chamber, said second stream of air converging upon said first stream of air at a cleaning zone located within said cleaning chamber.

23. A system as set forth in claim 21 further comprising means for controlling the movement of said object through said first window, said cleaning chamber and said second window and for controlling said first curtain of air, said second curtain of air and said first stream of air such that said first curtain of air, said second curtain of air and said first stream of air are turned off while said object enters said cleaning chamber and turned on after said object is fully received within said cleaning chamber.

24. A system as set forth in claim 23 wherein said means for moving said object comprises an endless, moving conveyor.

25. An apparatus for removing particulates from the surface of an object, said apparatus comprising:

means defining a cleaning chamber to receive an object, said cleaning chamber having a constantly open opening allowing an object to be moved at all times freely between said chamber and the external environment surrounding said chamber, means for developing a first stream of air within said cleaning chamber, said first stream of air being aimed at a cleaning zone within said cleaning chamber to remove particulates from an object when said object is located in said cleaning zone, means for developing a second stream of air within said cleaning chamber, said second stream of air being aimed at said cleaning zone and intersecting said first stream of air in the vicinity of said cleaning zone causing turbulence, means for recirculating the air of said first stream and the air of said second stream, and means for filtering the recirculated air to remove particulates, said means for filtering comprising a high efficiency particulate filter.

26. An apparatus as set forth in claim 25 wherein said first stream of air is directed generally parallel to said opening and said second stream of air is directed generally parallel to said opening.

27. An apparatus as set forth in claim 25 further comprising means for developing a curtain of air within said chamber which curtain of air is located ajdacent said opening and flows across said opening generally in a plane parallel to said opening to cover said opening and to thereby inhibit particulates removed from an object by said first and second stream from escaping from said chamber through said opening, the air of said curtain being recirculated by said means for recirculating the air of said first stream and the air of said second stream, and being filtered by said means for filtering the recircualted air.

28. An apparatus for removing particulates from a person's gloved hand, said apparatus comprising:

means defining a cleaning chamber to receive a person's gloved hand while excluding said person's torso, said cleaning chamber having a constantly open opening through which a person's hand gloved by a glove unattached to said chamber defining means may be moved at all times freely between said cleaning chamber and the external environment surrounding said chamber, means for developing at least one stream of air within said cleaning chamber to remove particulates from said gloved hand when received within said cleaning chamber, means for recirculating the air of said first stream, and means for filtering the recirculated air to remove particulates.

29. An apparatus as set forth in claim 28 wherein said means for filtering comprises a high efficiency particulate filter which is capable of removing particulates approximately 0.3 microns in diameter.

30. An apparatus as set forth in claim 29 further comprising means for developing a curtain of air within said chamber which curtain of air is located adjacent said opening and flows across said opening generally in a plane parallel to said opening to cover said opening and to thereby inhibit particulates removed from a gloved hand from escaping from said cleaning chamber, the air of said curtain being recirculated and being filtered by said means for filtering.

31. An apparatus as set forth in claim 30 further comprising means for developing a second stream of air within said cleaning chamber to clean particulates from a gloved hand, said first and second streams of air converging upon one another at a cleaning zone and causing turbulence.

32. An apparatus as set forth in claim 31 wherein said apparatus is small enough to fit on a desk top.

33. An apparatus as set forth in claim 28 wherein said apparatus is small enough to fit on a desk top.

34. An apparatus as set forth in claim 28 further comprising means for actuating said means for developing at least one stream of air in response to the presence of an object in said cleaning chamber.

35. An apparatus as set forth in claim 34 further comprising means for turning off said at least one stream of air at least one second after an object is withdrawn from said cleaning chamber.

36. An apparatus as set forth in claim 35 wherein said means for activating said at least one stream of air includes a photoelectric eye positioned to sense the presence of an object within said cleaning chamber.

37. An apparatus for removing particulates from objects, said apparatus comprising:

means defining a cleaning chamber which is large enough to receive a person's hand but small enough to exclude the torso of said person, said cleaning chamber having a constantly open opening on at least one side allowing an object to be moved by a person's hand at all times freely between said chamber and the external environment surrounding said chamber, means for developing a first stream of air within said cleaning chamber to remove particulates from an object when received within said cleaning chamber and held by a person's hand, means for receiving the air of said first stream and particulates removed from an object by the air of said first stream, and means for preventing the removed particulates from escaping into the environment surrounding said apparatus.

38. An apparatus as set forth in claim 37 wherein said means for receiving the air of said first stream and preventing the removed particulates from escaping comprises a filter which is capable of removing particulates less than 1.0 micron in diameter.

39. An apparatus as set forth in claim 37 further comprising means for developing a second stream of air within said cleaning chamber clean particulates from said object, said first and second streams of air converging upon one another at a cleaning zone and causing turbulence.

40. An apparatus for removing particulates from objects, said apparatus comprising:
   means for defining a cleaning chamber which is large enough to receive a person's hand but small enough to exclude the remainder of said person, said cleaning chamber having a constantly open opening on a first side allowing an object to be moved by a person's hand at all times freely between said chamber and the external environment surrounding said chamber,
   means for developing a first flow of air within said cleaning chamber to remove particulates from an object when received within said cleaning chamber,
   means for receiving the air of said first flow and particulates removed from an object and entrained by the air of said first flow, and
   means for preventing the removed particulates from escaping into the environment surrounding said apparatus.

41. An apparatus as set forth in claim 40 wherein said means for receiving the air of said first flow and preventing the removed particulates from escaping comprises means for filtering the received air.

42. An apparatus as set forth in claim 41 wherein said means for receiving the air of said first flow and preventing the removed particulates from escaping further comprises means for developing a curtain of air within said chamber which curtain of air is located adjacent said opening and flows across said opening generally in a plane parallel to said opening to cover said opening and to thereby inhibit particulates removed from an object from escaping from said cleaning chamber, the air of said curtain being recirculated and being filtered by said means for filtering.

43. An apparatus as set forth in claim 42 further comprising means for developing a second flow of air within said cleaning chamber to clean particulates from an object, said first and second flows of air converging upon one another causing turbulence.

* * * * *